US010989072B2

(12) United States Patent
Whiston et al.

(10) Patent No.: US 10,989,072 B2
(45) Date of Patent: Apr. 27, 2021

(54) TURBOCHARGER HEAT SHIELD

(71) Applicant: Ford Global Technologies, LLC, Dearborn, MI (US)

(72) Inventors: Philip Whiston, Ingatestone (GB); Anthony Hughes, Brentwood (GB); Richard Dukes, Doncaster (GB); Steven Johnson, Brentwood (GB); Richard Holdsworth, Billericay (GB)

(73) Assignee: Ford Global Technologies, LLC, Dearborn, MI (US)

( * ) Notice: Subject to any disclaimer, the term of this patent is extended or adjusted under 35 U.S.C. 154(b) by 220 days.

(21) Appl. No.: 16/216,909

(22) Filed: Dec. 11, 2018

(65) Prior Publication Data

US 2019/0186295 A1    Jun. 20, 2019

(30) Foreign Application Priority Data

Dec. 15, 2017  (GB) ...................................... 1721048

(51) Int. Cl.
*F01D 25/14* (2006.01)
*F02C 6/12* (2006.01)
(Continued)

(52) U.S. Cl.
CPC ......... *F01D 25/145* (2013.01); *F01D 21/045* (2013.01); *F01D 25/125* (2013.01);
(Continued)

(58) Field of Classification Search
CPC .... F01D 25/145; F01D 25/125; F01D 25/183; F01D 21/045; F01D 5/046; F01D 25/186;
(Continued)

(56) References Cited

U.S. PATENT DOCUMENTS 3,004,782 A * 10/1961 Meermans ............ F01D 25/183
                                                          277/347
6,418,722 B1 * 7/2002 Arnold .................. F01D 25/168
                                                          417/407
(Continued)

FOREIGN PATENT DOCUMENTS

CH        676737 A5    2/1991
DE       3235538 A1    3/1984
(Continued)

OTHER PUBLICATIONS

Great Britain Intellectual Property Office, Combined Search and Examination Report under Sections 17 and 18(3) Issued in Application No. GB1721048.5, dated Jun. 12, 2018, 5 pages.

*Primary Examiner* — Christopher Verdier
(74) *Attorney, Agent, or Firm* — Geoffrey Brumbaugh McCoy Russell LLP (57) ABSTRACT

Methods and systems are provided for a turbocharger. In one example, the turbocharger comprises a turbine rotor mounted on a shaft and supported within a turbocharger housing; an oil seal arranged within the turbocharger housing; and a heat shield located adjacent to the oil seal within the turbocharger housing, the heat shield having an aperture through which the shaft extends, wherein the heat shield is configured to substantially maintain the position of the oil seal in the event of failure of the turbocharger.

19 Claims, 5 Drawing Sheets

(51) Int. Cl.
*F01D 25/12* (2006.01)
*F01D 25/18* (2006.01)
*F01D 21/04* (2006.01)
*F02B 39/00* (2006.01)

(52) U.S. Cl.
CPC ............ *F01D 25/183* (2013.01); *F02B 39/00* (2013.01); *F02C 6/12* (2013.01); *F05D 2220/40* (2013.01); *F05D 2240/14* (2013.01); *F05D 2240/55* (2013.01); *F05D 2260/231* (2013.01); *F05D 2260/98* (2013.01)

(58) Field of Classification Search
CPC ........... F05D 2260/98; F05D 2260/231; F05D 2220/40; F05D 2240/55; F05D 2240/14; F02B 37/18; F02B 39/00; F02B 39/14; F04B 17/00
USPC ................................ 60/602, 605.3; 417/407
See application file for complete search history.

(56) References Cited

U.S. PATENT DOCUMENTS

| | | |
|---|---|---|
| 2004/0022648 A1 | 2/2004 | Cabrales et al. |
| 2005/0175477 A1 | 8/2005 | Kopp et al. |
| 2006/0239841 A1 | 10/2006 | Panek |
| 2010/0196148 A1 | 8/2010 | Gee et al. |
| 2011/0223010 A1 | 9/2011 | Mundinger et al. |
| 2013/0294947 A1 | 11/2013 | Schlienger et al. |
| 2016/0177965 A1 | 6/2016 | Svihla et al. |

FOREIGN PATENT DOCUMENTS

| | | |
|---|---|---|
| DE | 102006033560 A1 | 1/2008 |
| JP | 2016118105 A | 6/2016 |

* cited by examiner

Prior Art

TURBOCHARGER HEAT SHIELD

CROSS REFERENCE TO RELATED APPLICATION

This application claims priority to Great Britain Patent Application No. 1721048.5, filed Dec. 15, 2017. The entire contents of the above-referenced application are hereby incorporated by reference in their entirety for all purposes.

FIELD

The present description relates generally to a turbocharger heat shield further configured to block an oil leak in response to a turbocharger degradation.

BACKGROUND/SUMMARY

Modern internal combustion engines, both petrol and diesel use turbochargers to improve performance. A turbocharger consists of a compressor powered by a turbine which is driven by the exhaust gas from the engine. A shaft connects the turbine to the compressor and oil is used to lubricate the bearings that hold the shaft.

The turbine rotor may comprise a radial shape where the exhaust gas enters flow passages defined by the turbine rotor at 90 degrees, e.g. perpendicular, to the shaft axis. To improve performance, the inlet of a turbine may be reconfigured to receive a flow with a component perpendicular to the shaft axis and a component parallel to the shaft axis. These turbines are called mixed flow radial/axial turbines. For mixed flow turbines, the diameters of the turbine rotor at the inlet and outlet are often more similar in size, compared with radial inlet designs, in which the intake part of the wheel can be considerably bigger than the outlet part. As a result, mixed flow turbines can be created with a smaller outer diameter.

A consequence of the radial shape is that, in the rare circumstance that a turbocharger shaft degrades, the turbine rotor could be able to pass through the exit hole for exhaust to flow out of the turbine housing. If such a degradation occurs, the turbine rotor is no longer able to prevent an oil seal of the turbocharger from being breached and possibly escaping into the turbine housing. If the oil seal is breached, this could allow oil from the turbocharger bearings to flow out of the turbocharger into the hot exhaust system.

In one example, the issues described above may be addressed by a turbocharger comprising a turbine rotor mounted on a shaft and supported within a turbocharger housing, an oil seal arranged on the shaft to seal the shaft within a bearing housing, and a heat shield located between the oil seal and the turbine rotor within the turbocharger housing, the heat shield having an aperture through which the shaft extends, wherein the shaft comprises a groove into which the heat shield extends, and where the shaft is provided with a shoulder between the oil seal and the heat shield, the shoulder shaping an axial end wall of the groove, the heat shield is sized to engage the shoulder and limit the movement of the shaft and oil seal. In this way, the heat shield may prevent the oil seal from moving out of a position that allows it to seal oil in the bearing housing in the event that the shaft degrades At least a portion of the heat shield may have a radius less than an outer radius of the oil seal. For example, a diameter of the aperture may be smaller than an outside diameter of the oil seal. The diameter of the aperture may be smaller than the diameter of the shaft at the oil seal.

The shaft may comprise a groove into which the heat shield extends. The groove may comprise a recessed portion of the shaft having a diameter less than an adjacent portion of the shaft, e.g. on which the oil seal is provided. The groove may be provided between the oil seal and the turbine rotor. At least a portion of the heat shield may be axial aligned with the groove.

The axial distance between the heat shield and an axial end wall of the groove closest to the oil seal may be smaller than a distance between the axial end wall of the groove and the axial surface of the oil seal furthest from the heat shield.

The axial distance between the heat shield and an axial end wall of the groove closest to the oil seal may be smaller than a distance between an axial end face of the turbocharger housing and the oil seal.

The clearance between the heat shield and the adjacent end face of the turbocharger housing may be less that the axial thickness of the oil seal.

The shaft may be supported by at least one bearing arranged on an opposite side of the oil seal to the turbine rotor.

The oil seal may be arranged between the shaft and housing at a location along the shaft between the bearing and the heat shield.

The turbine may be a mixed flow turbine, e.g. configured such that the inlet flow to the turbine rotor has components in directions perpendicular to and parallel with the axis of rotation of the turbine rotor.

According to another aspect of the present disclosure, there is provided a method for assembling the turbocharger described above, the method comprising: assembling the heat shield loosely onto the shaft; coupling the turbine rotor to the shaft; installing the shaft into the turbocharger housing; coupling the heat shield to the turbocharger housing or a further housing of the turbocharger.

The step of assembling the heat shield onto the shaft may be performed before the turbine rotor is coupled to the shaft.

To avoid unnecessary duplication of effort and repetition of text in the specification, certain features are described in relation to only one or several aspects or embodiments of the present disclosure. However, it is to be understood that, where it is technically possible, features described in relation to any aspect or embodiment of the present disclosure may also be used with any other aspect or embodiment of the present disclosure.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2-3 are shown approximately to scale, although other relative dimensions may be used, if desired.

DETAILED DESCRIPTION

Figure 1:
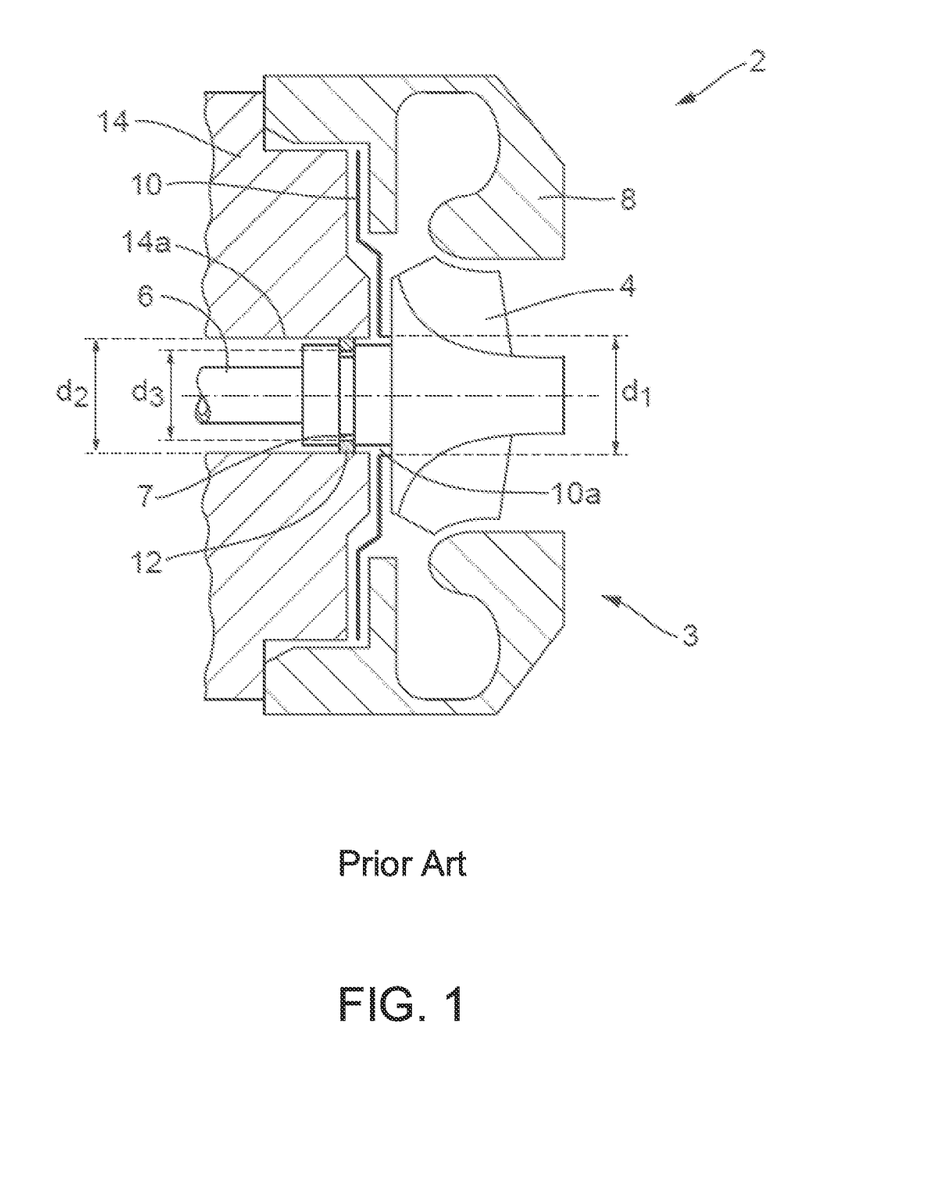
FIG. 1 illustrates schematic, cross-sectional side view of a previously example of a turbocharger.
Figure 2:
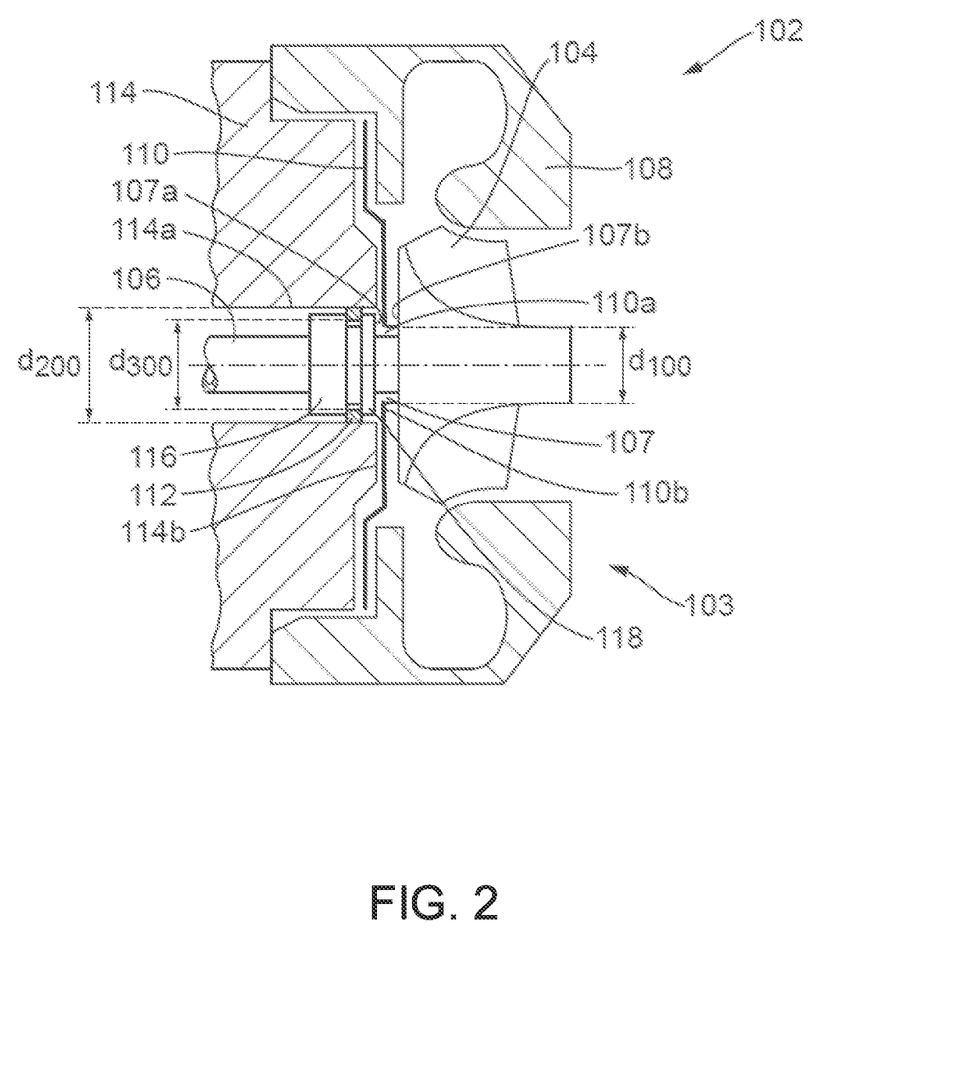
FIG. 2 illustrates a schematic, cross-sectional side view of the turbocharger according to arrangements of present disclosure.
Figure 3:
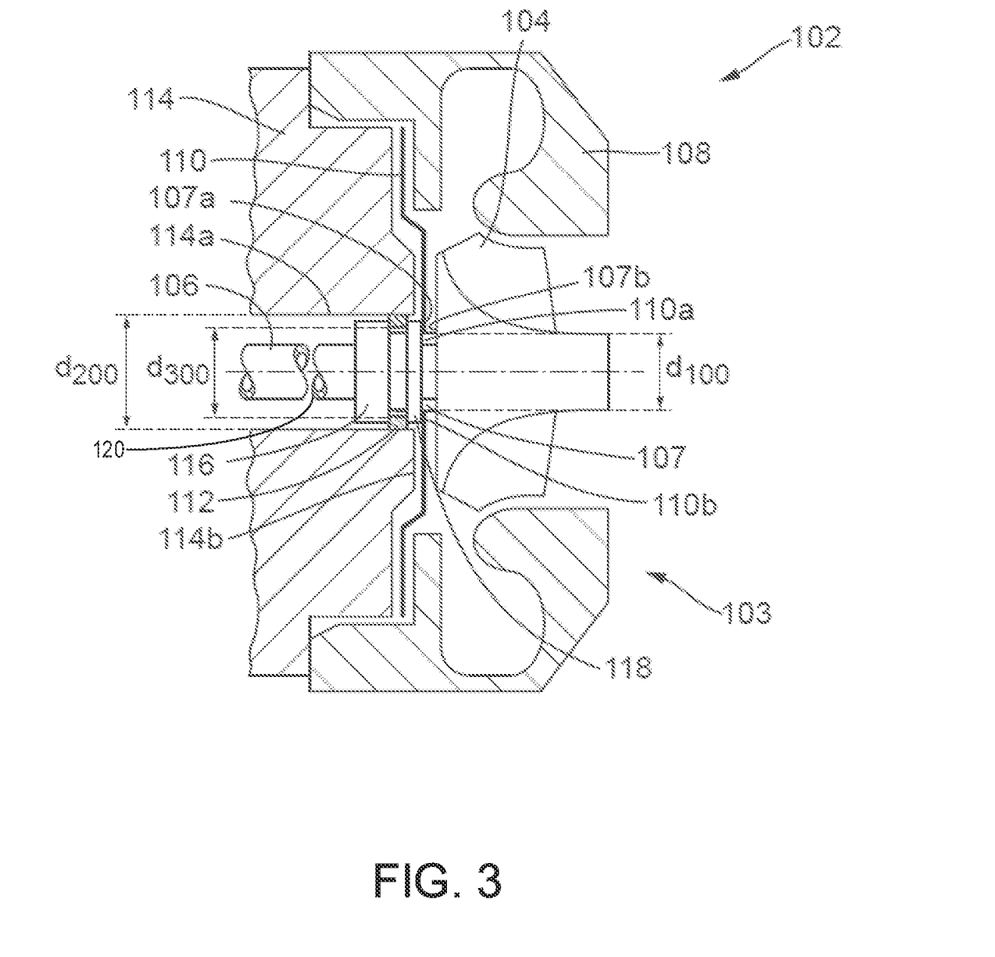
FIG. 3 illustrates a schematic, cross-sectional side view of the turbocharger according to arrangements of present disclosure after the turbocharger is degraded.
Figure 4:
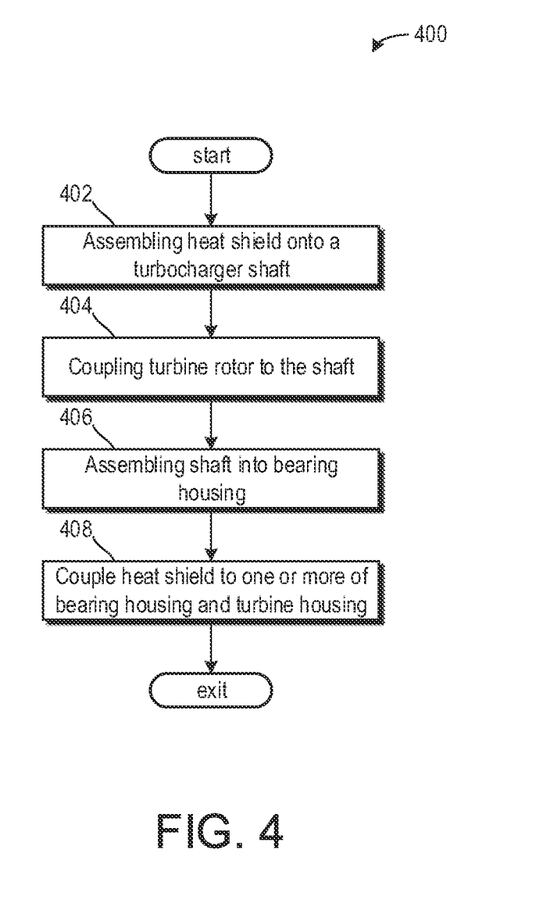
FIG. 4 illustrates a flow diagram illustrating a method of assembling a turbocharger according to the present disclosure.
Figure 5:
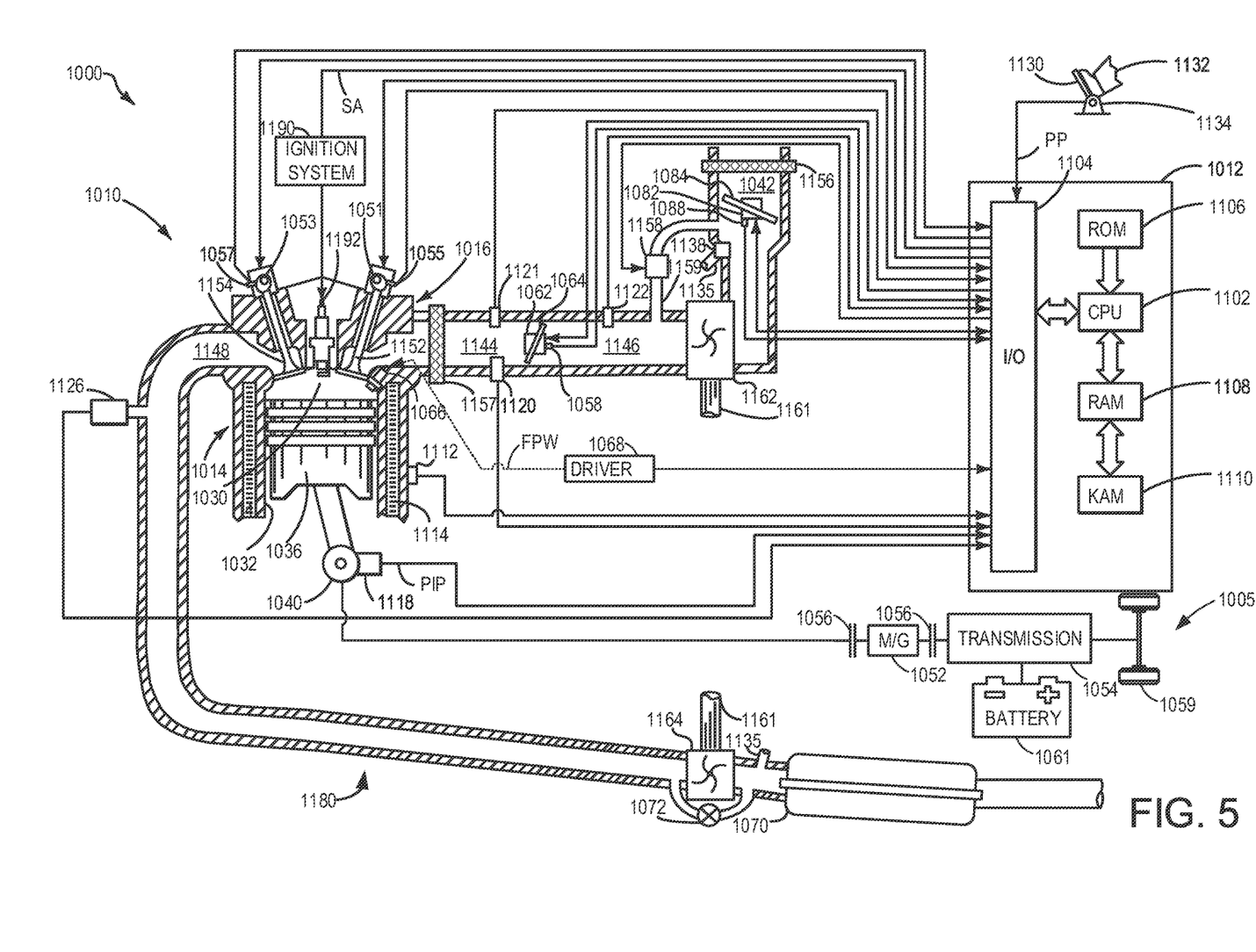
FIG. 5 illustrates a schematic of an engine which may comprise the turbocharger of FIGS. 2 and 3, the engine may be included in a hybrid vehicle.

The following description relates to systems and methods for a turbocharger. FIG. 1 shows a previous example of a turbocharger where a heat shield comprises an aperture for allowing a shaft to pass therethrough. The turbocharger further comprises an oil seal with an aperture for allowing the shaft to pass therethrough. The two apertures may comprise equally sized diameters. As such, the heat shield may not hold the oil seal in place if the shaft degrades. Furthermore, the turbocharger may need an extra component to hold the oil seal in place, which may increase packaging weight and constraints. FIGS. 2 and 3 show examples of a turbocharger comprising a heat shield with an aperture smaller than an aperture of the oil seal. The aperture of the heat shield may be reduced while avoiding contact with the shaft via a groove being arranged in the shaft, wherein the groove is axially aligned with the heat shield. The heat shield may extend into the groove to a location that would otherwise contact a full diameter of the shaft. The full diameter of the shaft may be greater than diameters of each of the groove and the aperture of the heat shield. The diameter of the aperture of the heat shield may be greater than a diameter of the groove. Thus, the heat shield may catch the oil seal and block it from moving too far out of a starting position, so that oil is maintained in the bearing housing if the shaft degrades. FIG. 4 illustrates a method for assembling the turbocharger comprising the heat shield and the groove. FIG. 5 illustrates an embodiment of a vehicle comprising an engine with a turbocharger, the turbocharger may be similar to the turbocharger of FIGS. 2 and 3.

FIGS. 1-3 and 5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

With reference to FIG. 1, a previous example of a proposed turbocharger 2 comprises a turbine 3 including a turbine rotor 4 arranged within a turbine housing 8. As depicted, the turbine 3 is a mixed flow turbine configured such that an inlet flow of exhaust gases to the turbine rotor 4 has components in directions parallel with and perpendicular to a rotational axis of the turbine rotor 4.

The turbine rotor 4 is mounted on a shaft 6 of the turbocharger 2. The shaft 6 is supported by bearings (not shown), contained within a bearing housing 14 of the turbocharger 2, to enable rotation of the turbine rotor 4 within the turbine housing 8.

An oil seal 12 is arranged within the bearing housing 14 between an inner wall 14a of the bearing housing 14 and the shaft 6. The oil seal 12 is configured to prevent oil leaking out of the bearing housing 14 into the turbine housing 8 or into the exhaust system.

The oil seal 12 may extend circumferentially around the shaft 6 such that the inner circumferential surface of the oil seal 12, of diameter d3, describes a surface parallel to the outer circumference of the shaft 6. As depicted, a radial gap 7 may be present between the inner circumferential surface of the oil seal 12 and the shaft 6. However, in other arrangements, no radial gap may be present, e.g. the oil seal 12 may occupy the full radial space between the shaft and the bearing housing. Alternatively, a further seal may be provided in the radial gap 7 between the oil seal 12 and the shaft 6.

The oil seal 12 may comprise a desirable form of seal capable of blocking the leaking of oil out of the bearing housing. For example, the seal may comprise a lip seal, brush seal, or face seal.

The turbocharger 2 further comprises a heat shield 10 arranged to reduce the heating of the bearing housing 14 and bearings by hot exhaust gases.

The heat shield 10 may be rigid or flexible and may be made from materials such as steel, aluminum or a composite or textile material and may comprise a thermal barrier coating, such as a ceramic thermal barrier coating, provided on one or more surfaces of the heat shield.

As depicted, the heat shield 10 may be arranged between the turbine rotor 4 and turbine housing 8, and the bearing housing 14. The heat shield thereby forms a barrier between hot exhaust gases passing through the turbine 3, and the bearing housing 14.

The heat shield 10 generally extends circumferentially around the shaft 6 and comprises an aperture 10a through which the shaft extends.

During assembly of the turbocharger 2, the heat shield 10 may be fixed to the bearing housing 14 and the shaft 6 is then inserted through the aperture of the heat shield 10.

In some arrangements, the oil seal 12 is mounted on the shaft 6 before the shaft is inserted through the aperture of the heat shield 10. Alternatively, the oil seal 12 may be inserted through the aperture 10a of the heat shield and coupled to the bearing housing 14 before the shaft 6 is assembled into the turbocharger 2.

In either case, it is desirable for a diameter d1 of the aperture 10a to be equal to or greater than an outside diameter d2 of the oil seal 12, so that the oil seal 12 and the shaft 6 can be assembled through the aperture 10a.

When the turbocharger 2 is assembled, an axial clearance may be provided between the turbine 4 and the heat shield 10 and a radial clearance may be provided between the shaft 6 and the heat shield 10, thereby allowing the shaft 6 to turn without wear between the components.

Turning now to FIG. 2, a turbocharger 102 according to arrangements of the present disclosure comprises a turbine 103 having a turbine rotor 104 supported within a turbine housing 108. The turbine rotor 104 is mounted on a shaft 106 of the turbocharger. The turbine rotor 104, turbine housing 108 and shaft 106 may be similar to the turbine rotor 4, turbine housing 8 and shaft 6 described above with respect to FIG. 1.

A heat shield 110 is located between the turbine 103 and a bearing housing 114 of the turbocharger 102. The turbocharger 102 further comprises an oil seal 112 arranged within the bearing housing 114. Features described above in relation to the oil seal 12 and the heat shield 10 may apply equally to the oil seal 112 and the heat shield 110 respectively.

The heat shield 110 differs from heat shield 10 in that heat shield 110 is further configured to substantially maintain the position of the oil seal 112 in the event of a degradation of the turbocharger 102.

At least a portion of the heat shield extends inwardly, such that an inner radius of at least a portion of the heat shield is less than the outer radius of the oil seal 112. In the arrangement depicted in the example of FIG. 2, an aperture 110a of the heat shield 110 has a diameter d100 that is smaller than an outside diameter d200 of the oil seal 112. However, in other arrangements, the aperture may have a diameter greater that the outer diameter of the oil seal 112 and the portion 110b may comprise one or more protrusions extending radially inwardly from the edge of the aperture.

If a turbocharger with a mixed flow turbine and a conventional heat shield, such as heat shield 10 of FIG. 1, were to degrade (e.g., fractures) at a point 120 on the shaft 106 illustrated in FIG. 3, the turbine rotor 104 may be capable of escaping from the turbine housing 108 and through the exhaust gas outlet. Since the oil seal 112 is coupled to the portion of the turbocharger shaft 106 still fixed to the turbine 103, it will move with it. Consequently, if the turbine is able to escape the turbine housing 108, the oil seal will travel with it allowing oil to escape into the hot exhaust system, resulting in additional degradation.

By contrast, in the arrangement of FIG. 3, with the heat shield 110 in which the portion 110b of the heat shield has a smaller diameter than the outer diameter of the oil seal 112, the heat shield 110 acts to retain the oil seal 112 within the bearing housing 114, thereby preventing the leakage of oil from the bearing housing 114 into the turbocharger housing 108. This may occur when a fracture of the shaft 106 is on a side of the bearing housing opposite the turbine housing, such as at point 120. That is to say, the heat shield may prevent the oil seal from leaking oil from the bearing housing when degradation of the shaft occurs at a location so that the oil seal is between the degradation and the heat shield.

The heat shield 110 according to aspects of the present disclosure therefore provides the additional function of preventing oil leakage in the event of failure of the turbocharger 102. This prevents turbocharger oil reaching the hot exhaust system. As noted above, turbochargers with conventional heat shields, such as heat shield 10 of FIG. 1, do not provide this oil seal retention function for at least the reason that the diameter of the heat shield is equal to the diameter of the oil seal. Additionally, as mention above, the heat shield 110 may comprise a diameter equal to a diameter of the oil seal 112, however, protrusions or other surface features may be included in the turbocharger 102 such that an effective diameter of the heat shield is less than the oil seal 112.

In some arrangements, the oil seal 112 may be held in position axially by a first axial retainer 116 located between the compressor rotor (not shown) and the oil seal 112, e.g. on an opposite side of the oil seal to the turbine rotor 4.

Additionally or alternatively, the oil seal 112 may be held in position axially by a second axial retainer 118 located between the turbine 104 and the oil seal 112 and axially adjacent to the oil seal 112.

The axial retainers 116, 118 may form part of the shaft 106. Alternatively, one or both of the axial retainers 116, 118 may be separate components. For example, the first or second axial retainer may be formed by a shoulder provided on the shaft 106.

Returning to FIG. 2, in one arrangement, the shaft 106 may comprise a recessed portion or groove 107 at a location between the turbine rotor 104 and the oil seal 112. The diameter at the base of the groove 107 may be less than the diameter of the second axial retainer 118. The diameter at the base of the groove may be less than the diameter of the shaft adjacent to the groove. For example, the diameter at the base of the groove may be less than diameter of the portion of the shaft 106 axially aligned with the oil seal 112 and/or the portion of the shaft 106 axially aligned with the bearings (not shown). Hence, the diameter of the recessed portion 107 of the shaft may be smaller than the inner diameter d100 of the oil seal 112.

As shown in FIG. 2, the second axial retainer 118 may form an axial end wall 107a of the groove 107 closest to the oil seal 112. Additionally or alternatively, the turbine rotor 104 may form an opposing axial end wall 107b of the grove 107. In an alternative arrangement, shoulders formed on the shaft 106 may provide one or more of the axial end walls 107a, 107b of the groove 107. That is to say, the shaft 106 returns to its original diameter outside of the groove 107 such that portions of the shaft immediately outside of the groove form end walls of the groove.

As depicted in FIG. 2, at least a portion of the heat shield 110 may be axially aligned within the groove 107. The heat shield 110 extends radially inward into the grove. The inner radius of at least the portion 110b of the heat shield is therefore less than the inner radius of the oil seal 112 and/or the outer diameter of the shaft 106 at the position of the oil seal 112. In the arrangement shown in FIG. 2, the diameter, d100 of the aperture 110a of the heat shield is less than the inner diameter, d300 of the oil seal 112.

The turbocharger 102 is configured such that, in the event of a degradation of the turbocharger shaft 106, the shaft, or a component attached to the shaft such as the second axial retainer 118, contacts the heat shield 110, before the shaft may continue to move such that the oil seal 112 is breached.

In the arrangement depicted in FIG. 2, an axial distance between the heat shield 110 and the axial end wall 107a of the groove 107 closest to the oil seal 112 is smaller than a distance between an axial end face of the turbocharger housing 114b and the oil seal 112. Hence, in the unlikely event of a degradation of the turbocharger 102, the heat shield 110 will resist axial movement of the second axial retainer 118 towards the turbine 103 such that the whole axial length of the oil seal 112 remains in contact with an inner wall 114a of the bearing housing 114. This prevents the formation of an open passage between the bearing housing 114 and the hot exhaust system through which oil may otherwise flow.

In other arrangements, the axial distance between the heat shield 110 and the axial end wall 107a of the groove 107 closest to the oil seal 112 may be smaller than a distance between the axial end wall of the groove 107a and the axial surface of the oil seal 112 furthest from the heat shield 110. In such arrangements, at least a portion of the oil seal 112 remains within the bearing housing 114, e.g. in contact with the inner wall 114a, to restrict oil leakage In some arrangements the axial thickness of the oil seal 112 may be greater than an axial clearance between the heat shield 110 and the bearing housing 114 such that the oil seal 112 may not pass between the heat shield 110 and the bearing housing 114.

As described above with respect to FIG. 1, previous examples of turbochargers may be assembled by fixing the heat shield 10 to the bearing housing in advance, and subsequently assembling the oil seal 12 and turbine rotor 4 on to the shaft 6 before inserting the free end of the shaft 6 into the bearing housing 14 through the aperture 10a in the heat shield 10. However, for turbochargers 102 according to the example of FIG. 2, this sequence of assembly is not feasible since the heat shield aperture 110a has a smaller diameter than the outside diameter d200 of the oil seal 112 and the shaft 106 at the location of the oil seal 112.

With reference to FIG. 4, the turbocharger 2 may be assembled using a method 400 according to arrangements of the present disclosure. In a first step 402 of the method, the heat shield 110 is assembled loosely onto the shaft 106. In a second step 404, the turbine rotor 104 is coupled to the shaft 106, e.g. by welding, brazing or any other desirable fixing method. In a third step 406, the shaft 106 is assembled into the bearing housing 114.

In a fourth step 408, the heat shield 110 is coupled to a component of the turbocharger 102, such as the bearing housing 114 and/or the turbine housing 108. The heat shield 110 may be coupled to the housing of the turbocharger 102 by methods including, but not limited to, clipping using stainless steel clips or adhering using high temperature tape or an adhesive.

FIG. 5 depicts an engine system 1000 for a vehicle. The vehicle may be an on-road vehicle having drive wheels which contact a road surface. Engine system 1000 includes engine 1010 which comprises a plurality of cylinders. FIG. 5 describes one such cylinder or combustion chamber in detail. The various components of engine 1010 may be controlled by electronic engine controller 1012.

Engine 1010 includes a cylinder block 1014 including at least one cylinder bore, and a cylinder head 1016 including intake valves 1152 and exhaust valves 1154. In other examples, the cylinder head 1016 may include one or more intake ports and/or exhaust ports in examples where the engine 1010 is configured as a two-stroke engine. The cylinder block 1014 includes cylinder walls 1032 with piston 1036 positioned therein and connected to crankshaft 1040. Thus, when coupled together, the cylinder head 1016 and cylinder block 1014 may form one or more combustion chambers. As such, the combustion chamber 1030 volume is adjusted based on an oscillation of the piston 1036. Combustion chamber 1030 may also be referred to herein as cylinder 1030. The combustion chamber 1030 is shown communicating with intake manifold 1144 and exhaust manifold 1148 via respective intake valves 1152 and exhaust valves 1154. Each intake and exhaust valve may be operated by an intake cam 1051 and an exhaust cam 1053. Alternatively, one or more of the intake and exhaust valves may be operated by an electromechanically controlled valve coil and armature assembly. The position of intake cam 1051 may be determined by intake cam sensor 1055. The position of exhaust cam 1053 may be determined by exhaust cam sensor 1057. Thus, when the valves 1152 and 1154 are closed, the combustion chamber 1030 and cylinder bore may be fluidly sealed, such that gases may not enter or leave the combustion chamber 1030.

Combustion chamber 1030 may be formed by the cylinder walls 1032 of cylinder block 1014, piston 1036, and cylinder head 1016. Cylinder block 1014 may include the cylinder walls 1032, piston 1036, crankshaft 1040, etc. Cylinder head 1016 may include one or more fuel injectors such as fuel injector 1066, one or more intake valves 1152, and one or more exhaust valves such as exhaust valves 1154. The cylinder head 1016 may be coupled to the cylinder block 1014 via fasteners, such as bolts and/or screws. In particular, when coupled, the cylinder block 1014 and cylinder head 1016 may be in sealing contact with one another via a gasket, and as such the cylinder block 1014 and cylinder head 1016 may seal the combustion chamber 1030, such that gases may only flow into and/or out of the combustion chamber 1030 via intake manifold 1144 when intake valves 1152 are opened, and/or via exhaust manifold 1148 when exhaust valves 1154 are opened. In some examples, only one intake valve and one exhaust valve may be included for each combustion chamber 1030. However, in other examples, more than one intake valve and/or more than one exhaust valve may be included in each combustion chamber 1030 of engine 1010.

In some examples, each cylinder of engine 1010 may include a spark plug 1192 for initiating combustion. Ignition system 1190 can provide an ignition spark to cylinder 1014 via spark plug 1192 in response to spark advance signal SA from controller 1012, under select operating modes. However, in some embodiments, spark plug 1192 may be omitted, such as where engine 1010 may initiate combustion by auto-ignition or by injection of fuel as may be the case with some diesel engines.

Fuel injector 1066 may be positioned to inject fuel directly into combustion chamber 1030, which is known to those skilled in the art as direct injection. Fuel injector 1066 delivers liquid fuel in proportion to the pulse width of signal FPW from controller 1012. Fuel is delivered to fuel injector 1066 by a fuel system (not shown) including a fuel tank, fuel pump, and fuel rail. Fuel injector 1066 is supplied operating current from driver 1068 which responds to controller 1012. In some examples, the engine 1010 may be a gasoline engine, and the fuel tank may include gasoline, which may be injected by injector 1066 into the combustion chamber 1030. However, in other examples, the engine 1010 may be a diesel engine, and the fuel tank may include diesel fuel, which may be injected by injector 1066 into the combustion chamber. Further, in such examples where the engine 1010 is configured as a diesel engine, the engine 1010 may include a glow plug to initiate combustion in the combustion chamber 1030.

Intake manifold 1144 is shown communicating with throttle 1062 which adjusts a position of throttle plate 1064 to control airflow to engine cylinder 1030. This may include controlling airflow of boosted air from intake boost chamber 1146. In some embodiments, throttle 1062 may be omitted and airflow to the engine may be controlled via a single air intake system throttle (AIS throttle) 1082 coupled to air intake passage 1042 and located upstream of the intake boost chamber 1146. In yet further examples, AIS throttle 1082 may be omitted and airflow to the engine may be controlled with the throttle 1062.

In some embodiments, engine 1010 is configured to provide exhaust gas recirculation, or EGR. When included, EGR may be provided as high-pressure EGR and/or low-pressure EGR. In examples where the engine 1010 includes low-pressure EGR, the low-pressure EGR may be provided via EGR passage 1135 and EGR valve 1138 to the engine air intake system at a position downstream of air intake system (AIS) throttle 1082 and upstream of compressor 1162 from a location in the exhaust system downstream of turbine 1164. EGR may be drawn from the exhaust system to the intake air system when there is a pressure differential to drive the flow. A pressure differential can be created by partially closing AIS throttle 1082. Throttle plate 1084 controls pressure at the inlet to compressor 1162. The MS may be electrically controlled and its position may be adjusted based on optional position sensor 1088.

Ambient air is drawn into combustion chamber 1030 via intake passage 1042, which includes air filter 1156. Thus, air first enters the intake passage 1042 through air filter 1156. Compressor 1162 then draws air from air intake passage 1042 to supply boost chamber 1146 with compressed air via a compressor outlet tube (not shown in FIG. 5). In some examples, air intake passage 1042 may include an air box (not shown) with a filter. In one example, compressor 1162 may be a turbocharger, where power to the compressor 1162 is drawn from the flow of exhaust gases through turbine 1164. Specifically, exhaust gases may spin turbine 1164 which is coupled to compressor 1162 via shaft 1161. Shaft 1161 may be similarly to shaft 106 of FIG. 2. A wastegate 1072 allows exhaust gases to bypass turbine 1164 so that boost pressure can be controlled under varying operating conditions. Wastegate 1072 may be closed (or an opening of the wastegate may be decreased) in response to increased boost demand, such as during an operator pedal tip-in. By closing the wastegate, exhaust pressures upstream of the turbine can be increased, raising turbine speed and peak power output. This allows boost pressure to be raised. Additionally, the wastegate can be moved toward the closed position to maintain desired boost pressure when the compressor recirculation valve is partially open. In another example, wastegate 1072 may be opened (or an opening of the wastegate may be increased) in response to decreased boost demand, such as during an operator pedal tip-out. By opening the wastegate, exhaust pressures can be reduced, reducing turbine speed and turbine power. This allows boost pressure to be lowered.

However, in alternate embodiments, the compressor 1162 may be a supercharger, where power to the compressor 1162 is drawn from the crankshaft 1040. Thus, the compressor 1162 may be coupled to the crankshaft 1040 via a mechanical linkage such as a belt. As such, a portion of the rotational energy output by the crankshaft 1040, may be transferred to the compressor 1162 for powering the compressor 1162.

Compressor recirculation valve 1158 (CRV) may be provided in a compressor recirculation path 1159 around compressor 1162 so that air may move from the compressor outlet to the compressor inlet so as to reduce a pressure that may develop across compressor 1162. A charge air cooler 1157 may be positioned in boost chamber 1146, downstream of compressor 1162, for cooling the boosted aircharge delivered to the engine intake. However, in other examples as shown in FIG. 1, the charge air cooler 1157 may be positioned downstream of the electronic throttle 1062 in an intake manifold 1144. In some examples, the charge air cooler 1157 may be an air to air charge air cooler. However, in other examples, the charge air cooler 1157 may be a liquid to air cooler.

In the depicted example, compressor recirculation path 1159 is configured to recirculate cooled compressed air from upstream of charge air cooler 1157 to the compressor inlet. In alternate examples, compressor recirculation path 1159 may be configured to recirculate compressed air from downstream of the compressor and downstream of charge air cooler 1157 to the compressor inlet. CRV 1158 may be opened and closed via an electric signal from controller 1012. CRV 1158 may be configured as a three-state valve having a default semi-open position from which it can be moved to a fully-open position or a fully-closed position.

Universal Exhaust Gas Oxygen (UEGO) sensor 1126 is shown coupled to exhaust manifold 1148 upstream of emission control device 1070. Alternatively, a two-state exhaust gas oxygen sensor may be substituted for UEGO sensor 1126. Emission control device 1070 may include multiple catalyst bricks, in one example. In another example, multiple emission control devices, each with multiple bricks, can be used. While the depicted example shows UEGO sensor 1126 upstream of turbine 1164, it will be appreciated that in alternate embodiments, UEGO sensor may be positioned in the exhaust manifold downstream of turbine 1164 and upstream of emission control device 1070. Additionally or alternatively, the emission control device 1070 may comprise a diesel oxidation catalyst (DOC) and/or a diesel cold-start catalyst, a particulate filter, a three-way catalyst, a $NO_x$ trap, selective catalytic reduction device, and combinations thereof. In some examples, a sensor may be arranged upstream or downstream of the emission control device 1070, wherein the sensor may be configured to diagnose a condition of the emission control device 1070.

Controller 1012 is shown in FIG. 1 as a microcomputer including: microprocessor unit 1102, input/output ports 1104, read-only memory 1106, random access memory 1108, keep alive memory 1110, and a conventional data bus. Controller 1012 is shown receiving various signals from sensors coupled to engine 1010, in addition to those signals previously discussed, including: engine coolant temperature (ECT) from temperature sensor 1112 coupled to cooling sleeve 1114; a position sensor 1134 coupled to an input device 1130 for sensing input device pedal position (PP) adjusted by a vehicle operator 1132; a knock sensor for determining ignition of end gases (not shown); a measurement of engine manifold pressure (MAP) from pressure sensor 1121 coupled to intake manifold 1144; a measurement of boost pressure from pressure sensor 1122 coupled to boost chamber 1146; an engine position sensor from a Hall effect sensor 1118 sensing crankshaft 1040 position; a measurement of air mass entering the engine from sensor 1120 (e.g., a hot wire air flow meter); and a measurement of throttle position from sensor 1058. Barometric pressure may also be sensed (sensor not shown) for processing by controller 1012. In a preferred aspect of the present description, Hall effect sensor 1118 produces a predetermined number of equally spaced pulses every revolution of the crankshaft from which engine speed (RPM) can be determined. The input device 1130 may comprise an accelerator pedal and/or a brake pedal. As such, output from the position sensor 1134 may be used to determine the position of the accelerator pedal and/or brake pedal of the input device 1130, and therefore determine a desired engine torque. Thus, a desired engine torque as requested by the vehicle operator 1132 may be estimated based on the pedal position of the input device 1130.

In some examples, vehicle 1005 may be a hybrid vehicle with multiple sources of torque available to one or more vehicle wheels 1059. In other examples, vehicle 1005 is a conventional vehicle with only an engine, or an electric vehicle with only electric machine(s). In the example shown, vehicle 1005 includes engine 1010 and an electric machine 1052. Electric machine 1052 may be a motor or a motor/generator. Crankshaft 1040 of engine 1010 and electric machine 1052 are connected via a transmission 1054 to vehicle wheels 1059 when one or more clutches 1056 are engaged. In the depicted example, a first clutch 1056 is provided between crankshaft 1040 and electric machine 1052, and a second clutch 1056 is provided between electric machine 1052 and transmission 1054. Controller 1012 may send a signal to an actuator of each clutch 1056 to engage or disengage the clutch, so as to connect or disconnect crankshaft 1040 from electric machine 1052 and the components connected thereto, and/or connect or disconnect electric machine 1052 from transmission 1054 and the components connected thereto. Transmission 1054 may be a gearbox, a planetary gear system, or another type of transmission. The powertrain may be configured in various manners including as a parallel, a series, or a series-parallel hybrid vehicle.

Electric machine 1052 receives electrical power from a traction battery 1061 to provide torque to vehicle wheels 1059. Electric machine 1052 may also be operated as a generator to provide electrical power to charge battery 1061, for example during a braking operation.

The controller 1012 receives signals from the various sensors of FIG. 5 and employs the various actuators of FIG. 5 to adjust engine operation based on the received signals and instructions stored on a memory of the controller. For example, adjusting operation of the electric machine 1052 may occur based on feedback from ECT sensor 1112. As will be described in greater detail below, the engine 1010 and electric machine 1052 may be adjusted such that their operations may be delayed based on one or more of a powertrain temperature, which may be estimated based on feedback from ECT sensor 1112, and a distance between an intended destination and an electric-only operation range.

Thus, in one embodiment, a turbocharger may be improved by extending a heat shield arranged between a turbine wheel and an oil seal assembly into a groove arranged in a shaft. The groove may also be arranged between the turbine wheel and oil seal assembly. By arranging the groove, the heat shield may be extended without introducing increased wear to the shaft while also shaping the heat shield to block the oil seal assembly from releasing an oil seal in an event where the shaft may be degraded (e.g., cracked). The heat shield may still allow the turbine wheel to leave to the turbine housing while keeping the oil seal assembly in a location where oil is still sealed from flowing into an exhaust passage. To achieve this configuration, the heat shield may be loosely mounted onto the turbine shaft prior to the turbine motor being mounted onto the shaft. The heat shield may then be fixedly coupled to one or more of the turbine housing and/or bearing housing, thereby allowing the heat shield to block the bearing housing from direct exhaust gas heat while blocking excessive movement of the oil seal assembly in the event of a turbocharger shaft degradation. In this way, the heat shield may be arranged on and in face-sharing contact with the turbine shaft without being physically coupled (e.g., fixedly coupled) to the turbine shaft. Excessive movement of the oil seal assembly may include where the oil seal moves some amount such that oil may flow passed the oil seal and into an exhaust passage. Thus, if the shaft degrades, the oil seal may move, but it may not move enough to allow oil to leak due to the arrangement of the heat shield described above.

In this way, a heat shield may be mounted in a turbine housing, wherein the heat shield may extend into a groove arranged in a turbocharger shaft. The groove may allow the heat shield to extend radially inward further without increasing wear on the turbocharger shaft. The technical effect of extending the heat shield radially inward is to block an oil seal from disrupting a seal if the turbocharger shaft degrades. The heat shield may block the oil seal from escaping with the turbine wheel.

An embodiment of a turbocharger comprising a turbine rotor mounted on a shaft and supported within a turbocharger housing, an oil seal arranged on the shaft to seal the shaft within a bearing housing, and a heat shield located between the oil seal and the turbine rotor within the turbocharger housing, the heat shield having an aperture through which the shaft extends, wherein the shaft comprises a groove into which the heat shield extends, and where the shaft is provided with a shoulder between the oil seal and the heat shield, the shoulder shaping an axial end wall of the groove, the heat shield is sized to engage the shoulder and limit the movement of the shaft and oil seal. A first example of the turbocharger further comprises where at least a portion of the heat shield has a radius less than an outer radius of the oil seal. A second example of the turbocharger, optionally including the first, further includes where a diameter of the aperture is smaller than an outside diameter of the oil seal. A third example of the turbocharger, optionally including the first and/or second examples, further includes where a diameter of the aperture is smaller than a diameter of the shoulder of the shaft at the oil seal, and where the diameter of the aperture is larger than a diameter of the groove. A fourth example of the turbocharger, optionally including one or more of the first through third examples, further includes where an axial distance between the heat shield and the axial end wall of the groove closest to the oil seal is smaller than a distance between the axial end wall of the groove and an axial surface of the oil seal furthest from the heat shield. A fifth example of the turbocharger, optionally including one or more of the first through fourth examples, further includes where the axial distance between the heat shield and the axial end wall of the groove closest to the oil seal is smaller than a distance between an axial end face of the turbocharger housing and the oil seal. A sixth example of the turbocharger, optionally including one or more of the first through fifth examples, further includes where a clearance between the heat shield and an adjacent end face of the turbocharger housing is less that the axial thickness of the oil seal. A seventh example of the turbocharger, optionally including one or more of the first through sixth examples, further includes where the shaft is supported by a portion of the bearing housing on an opposite side of the oil seal relative to the turbine rotor. An eighth example of the turbocharger, optionally including one or more of the first through seventh examples, further includes where the oil seal is arranged between the shaft and housing at a location along the shaft between the bearing and the heat shield. A ninth example of the turbocharger, optionally including one or more of the first through eighth examples, further includes where a turbine of the turbocharger is a mixed flow turbine.

Another embodiment of a turbocharger comprises a turbine connected to a shaft, the turbine and the shaft being housed in a turbine housing, an oil seal arranged between the shaft and the turbine housing, and a heat shield arranged between the turbine and the oil seal, the heat shield extending radially inward into a groove arranged in the shaft, wherein a heat shield aperture and an oil seal aperture allow the shaft to extend therethrough, and where a diameter of the heat shield aperture is less than a diameter of the oil seal aperture. A first example of the turbocharger further includes where the heat shield is fixed to the turbine housing. A second example of the turbocharger, optionally including the first example, further includes where the oil seal is shaped to prevent oil from flowing from the bearing housing to an exhaust passage, and where the heat shield maintains a position of the oil seal during degradation of the shaft. A third example of the turbocharger, optionally including the first and/or second examples, further includes where degradation of the shaft includes a crack or a fracture. A fourth example of the turbocharger, optionally including one or more of the first through fourth examples, further includes where a turbine rotor escapes the turbine housing in response to degradation of the shaft.

A further representation of a turbocharger comprises a turbine arranged on a shaft, the shaft comprising a groove arranged between a turbine housing and a bearing housing and a heat shield arranged between the turbine housing and the bearing housing and extending into the groove, the heat shield comprising an aperture for allowing the shaft to extend therethrough, the aperture smaller than an opening of an oil seal. A first example of the turbocharger further comprises where the oil seal is shaped to block oil from flowing from the bearing housing to an exhaust passage arranged in the turbine housing. A second example of the turbocharger, optionally including the first example, further comprises where the heat shield is fixedly coupled to the bearing housing, and where the heat shield blocks the oil seal from moving out of a position that blocks oil from flowing from the bearing housing to the exhaust passage in response to the shaft cracking. A third example of the turbocharger, optionally including the first and/or second examples, further includes where a clearance is arranged between a turbine wheel and the heat shield. A fourth example of the turbocharger, optionally including one or more of the first through third examples, further includes where the heat shield is loosely assembled to the turbine shaft.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A turbocharger comprising:
a turbine rotor mounted on a shaft and supported within a turbocharger housing;
an oil seal arranged on the shaft to seal the shaft within a bearing housing; and
a heat shield located between the oil seal and the turbine rotor within the turbocharger housing, the heat shield having an aperture through which the shaft extends, wherein the shaft comprises a groove into which the heat shield extends, and where the shaft is provided with a shoulder between the oil seal and the heat shield, the shoulder shaping an axial end wall of the groove, the heat shield is sized to engage the shoulder and limit movement of the shaft and oil seal, and the heat shield is fixedly coupled to the bearing housing.

2. The turbocharger of claim 1, wherein at least a portion of the heat shield has a radius less than an outer radius of the oil seal.

3. The turbocharger of claim 1, wherein a diameter of the aperture is smaller than an outside diameter of the oil seal.

4. The turbocharger of claim 1, wherein a diameter of the aperture is smaller than a diameter of the shoulder of the shaft at the oil seal, and where the diameter of the aperture is larger than a diameter of the groove.

5. The turbocharger of claim 1, wherein an axial distance between the heat shield and the axial end wall of the groove closest to the oil seal is smaller than a distance between the axial end wall of the groove and an axial surface of the oil seal furthest from the heat shield.

6. The turbocharger of claim 5, wherein the axial distance between the heat shield and the axial end wall of the groove closest to the oil seal is smaller than a distance between an axial end face of the turbocharger housing and the oil seal.

7. The turbocharger of claim 1, wherein a clearance between the heat shield and an adjacent end face of the turbocharger housing is less that the axial thickness of the oil seal.

8. The turbocharger of claim 1, wherein the shaft is supported by a portion of the bearing housing on an opposite side of the oil seal relative to the turbine rotor.

9. The turbocharger of claim 1, wherein the oil seal is arranged between the shaft and the bearing housing at a location along the shaft between a bearing and the heat shield.

10. The turbocharger of claim 1, wherein a turbine of the turbocharger is a mixed flow turbine.

11. A turbocharger comprising:
a turbine connected to a shaft, the turbine and the shaft being housed in a turbine housing;
an oil seal arranged between the shaft and the turbine housing; and
a heat shield arranged between the turbine and the oil seal, the heat shield extending radially inward into a groove arranged in the shaft, wherein a heat shield aperture and an oil seal aperture allow the shaft to extend therethrough, where a diameter of the heat shield aperture is less than a diameter of the oil seal aperture, and where the heat shield is fixed to the turbine housing.

12. The turbocharger of claim 11, wherein the oil seal is shaped to prevent oil from flowing from the bearing housing to an exhaust passage, and where the heat shield maintains a position of the oil seal during degradation of the shaft.

13. The turbocharger of claim 12, wherein the degradation of the shaft includes a crack or a fracture.

14. The turbocharger of claim 12, wherein a turbine rotor escapes the turbine housing in response to the degradation of the shaft.

15. A turbocharger comprising:
a turbine arranged on a shaft, the shaft comprising a groove arranged between a turbine housing and a bearing housing; and
a heat shield arranged between the turbine housing and the bearing housing and extending into the groove, the heat shield comprising an aperture for allowing the shaft to extend therethrough, the aperture smaller than an opening of an oil seal, and the heat shield is fixedly coupled to the bearing housing.

16. The turbocharger of claim 15, wherein the oil seal is shaped to block oil from flowing from the bearing housing to an exhaust passage arranged in the turbine housing.

17. The turbocharger of claim 16, wherein the heat shield blocks the oil seal from moving out of a position that blocks oil from flowing from the bearing housing to the exhaust passage in response to shaft cracking.

18. The turbocharger of claim 15, wherein a clearance is arranged between a turbine wheel and the heat shield.

19. The turbocharger of claim 15, wherein the heat shield is movably assembled to the turbine shaft.

* * * * *